(12) United States Patent
Kassemi et al.

(10) Patent No.: US 11,276,045 B2
(45) Date of Patent: Mar. 15, 2022

(54) VENDOR TOKEN GENERATOR

(71) Applicant: SWOOP IP HOLDINGS LLC, Wilmington, DE (US)

(72) Inventors: James Kassemi, Albuquerque, NM (US); Dave Walz-Burkett, Albuquerque, NM (US); Chad Person, Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 252 days.

(21) Appl. No.: 15/436,146

(22) Filed: Feb. 17, 2017

(65) Prior Publication Data

US 2017/0308873 A1    Oct. 26, 2017

Related U.S. Application Data

(63) Continuation of application No. 14/216,227, filed on Mar. 17, 2014, now abandoned.

(60) Provisional application No. 61/794,675, filed on Mar. 15, 2013.

(51) Int. Cl.
*G06Q 20/38* (2012.01)
*G06Q 20/10* (2012.01)
*G06Q 20/02* (2012.01)
*G06Q 20/32* (2012.01)

(52) U.S. Cl.
CPC ........... *G06Q 20/10* (2013.01); *G06Q 20/027* (2013.01); *G06Q 20/102* (2013.01); *G06Q 20/3255* (2013.01); *G06Q 20/382* (2013.01)

(58) Field of Classification Search
CPC ................................................ G06Q 20/3274
USPC ............................................................ 705/65
See application file for complete search history.

(56) References Cited

U.S. PATENT DOCUMENTS

| | | | |
|---|---|---|---|
| 5,903,652 A * | 5/1999 | Mital ................. | G06Q 20/0855 705/78 |
| 6,101,485 A | 8/2000 | Fortenberry et al. | |
| 6,175,823 B1 | 1/2001 | Van Dusen | |
| 8,606,703 B1 | 12/2013 | Dorsey et al. | |
| 8,725,635 B2 | 5/2014 | Klein et al. | |
| 8,762,272 B1 * | 6/2014 | Cozens ................. | G06Q 20/223 705/40 |
| 8,949,940 B1 * | 2/2015 | Shenoy ................. | G06Q 10/10 726/4 |
| 9,461,951 B2 * | 10/2016 | Salonen .................. | H04L 67/10 |
| 10,395,223 B2 | 8/2019 | Muthu et al. | |
| 10,515,345 B2 | 12/2019 | Koh et al. | |

(Continued)

*Primary Examiner* — Chinedu C Agwumezie
(74) *Attorney, Agent, or Firm* — Volpe Koenig

(57) ABSTRACT

A method for generating tokens for use in an email-based e-commerce transaction between third party vendor and a customer that is facilitated by a payment server is disclosed. The method may comprise generating a token for use with an email checkout, wherein the token comprises a customer name, and customer email address. The processor may generate an email message for at least one recipient, the email message including a mailto hyperlink including the token, wherein the mailto hyperlink generates an email response message addressed to the payment server including the token. The method may comprise receiving a notification from the payment server indicating that the at least one recipient that the email response message was successfully received by the payment server and the email-based e-commerce transaction is successful.

20 Claims, 7 Drawing Sheets

(56) References Cited

U.S. PATENT DOCUMENTS

| | | |
|---|---|---|
| 2009/0006233 A1 | 1/2009 | Chemtob |
| 2010/0070419 A1 | 3/2010 | Vadhri |
| 2011/0213707 A1 | 9/2011 | Jackson et al. |
| 2011/0313921 A1 | 12/2011 | Dheer |
| 2012/0130898 A1* | 5/2012 | Snyder ............... G06Q 20/4014 705/44 |
| 2012/0185382 A1* | 7/2012 | Fischer ................ G06Q 30/04 705/40 |
| 2012/0203707 A1 | 8/2012 | Hungerford |
| 2012/0204032 A1 | 8/2012 | Wilkins et al. |
| 2012/0215658 A1* | 8/2012 | Estrada .............. G06Q 20/3226 705/26.41 |
| 2012/0253896 A1* | 10/2012 | Killoran, Jr. ............ H04L 51/02 705/14.4 |
| 2012/0310753 A1* | 12/2012 | Gaddis ............... G06Q 30/0641 705/14.73 |
| 2012/0310826 A1 | 12/2012 | Chatterjee |
| 2012/0330736 A1 | 12/2012 | Beckner et al. |
| 2013/0018790 A1* | 1/2013 | Gururajan .............. G06Q 40/00 705/44 |
| 2013/0246203 A1 | 9/2013 | Laracey |
| 2014/0207628 A1 | 7/2014 | Erez |
| 2015/0371224 A1* | 12/2015 | Lingappa ........... G06Q 20/3825 705/71 |

\* cited by examiner

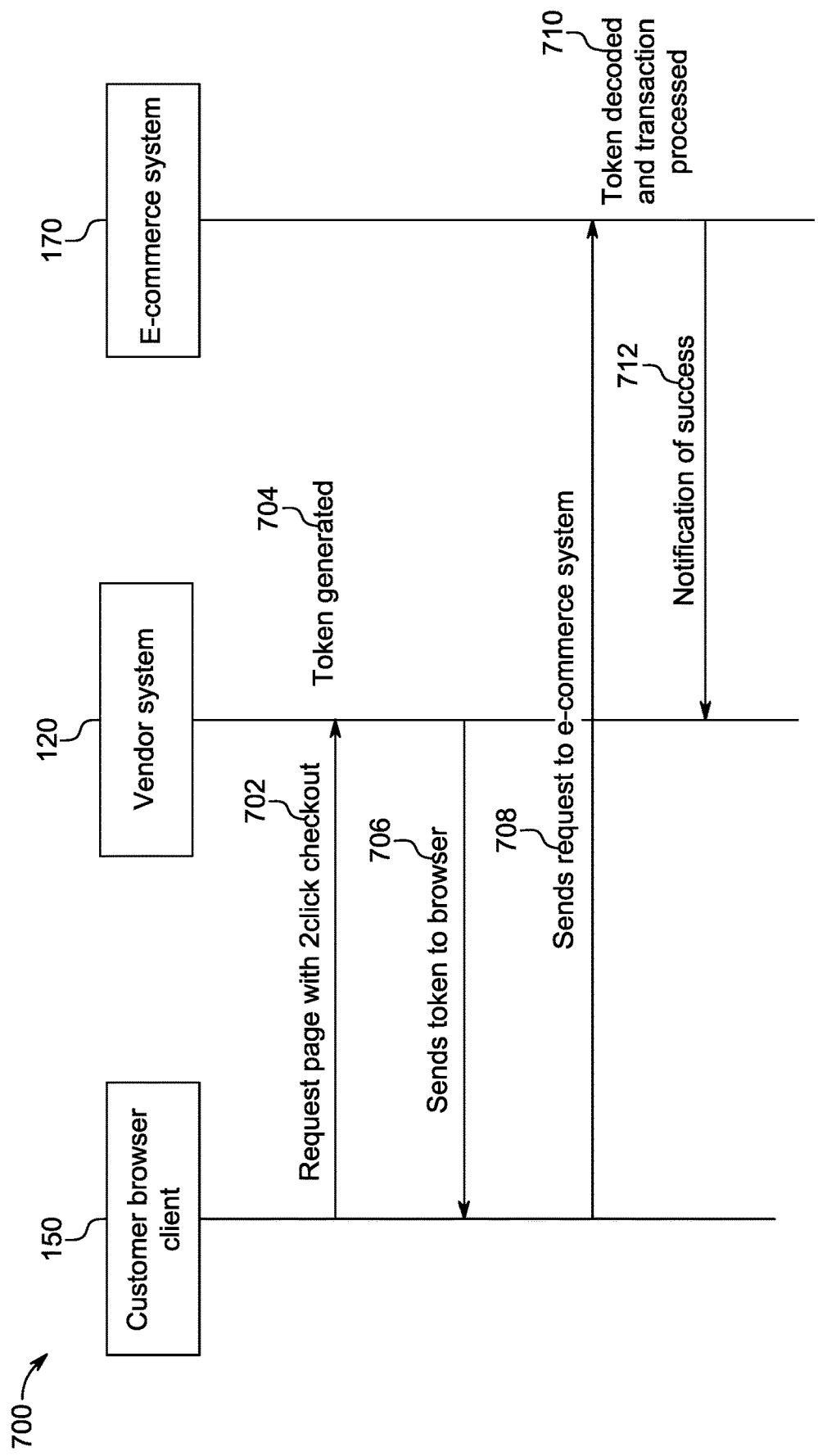

VENDOR TOKEN GENERATOR

CROSS REFERENCE TO RELATED APPLICATION

This application is a Continuation of U.S. patent application Ser. No. 14/216,227 filed Mar. 17, 2014, which claims the benefit of U.S. provisional Application No. 61/794,675, filed on Mar. 15, 2013, the entire contents of which are incorporated by reference as if fully set forth.

FIELD OF INVENTION

The present invention is related to electronic payment systems.

BACKGROUND

Vendors wishing to adopt an email-based payment method may need to integrate their own system with a third party system to use the email payment process. An email payment system may demand a close integration between the vendor and the e-commerce system. This setup may be time consuming and cumbersome for the vendor.

In designing an email payment system, problems may arise when the user base begins to scale the system to accommodate more users. The communication between the gateway and the vendor may be considerable depending on the size of the customer base and the array of offers. Larger numbers may use more bandwidth. Many online businesses' profits are dependent on the ability to scale their customer base. Any system that enters the marketplace must take into account large numbers of users. A system that would require the use of less bandwidth would be advantageous.

Online security is a concern for any vendor. Additionally, there are often security concerns since these third party systems are not located on the vendor's system. When adopting new systems many vendors prefer systems that allow them autonomy. Limiting the amount of communication between systems that may be communicating encrypted data over public networks reduces potential interference from outside parties. A process integrated directly in the vendor's system may reduce exposure.

Email-based payment systems contend with customers that are more familiar with web-based payment systems. Consumers expect to visit a URL to check out of merchandise. A two-click web URL checkout may be a desirable service for a vendor to provide to a client. The implementation of a tool that may generate tokens for web and email-based checkout may be desirable.

SUMMARY

As described in greater detail herein, the system is configured to provide vendors autonomy in generating tokens for both email and URL checkout. A token generator may be integrated directly in the vendor's system and may reduce communication with the email payment gateway. This configuration allows the vendor to produce tokens for email-based payments as well as two-click web-based checkout tokens. The token generator allows vendors to include secure tokens in advertising emails. The vendor server sends emails with tokens to customers that are registered to receive the email-based payment system. The emails contain hyperlinks that correspond to offers from the vendor. When the mailto hyperlink is selected, the new email contains a token that holds identifiers of the associated offer and purchaser. That email may then be sent to the email payment gateway. The system receives the email and decodes the contents of the email and processes the transaction. A corresponding offer may be generated for a two-click web transaction based on the token generator.

A method for generating tokens for use in an email-based e-commerce transaction between third party vendor and a customer that is facilitated by a payment server is disclosed. The method may comprise generating a token for use with an email checkout, wherein the token comprises a customer name, and customer email address. The processor may generate an email message for at least one recipient, the email message including a mailto hyperlink including the token, wherein the mailto hyperlink generates an email response message addressed to the payment server including the token. The method may comprise receiving a notification from the payment server indicating that the at least one recipient that the email response message was successfully received by the payment server and the email-based e-commerce transaction is successful.

BRIEF DESCRIPTION OF THE DRAWINGS

A more detailed understanding may be had from the following description, given by way of example in conjunction with the accompanying drawings wherein:

FIG. 7 shows a transactional diagram for a method for generating a token with a website.

DETAILED DESCRIPTION

When used herein, the term "token" may refer a sequence of byte data or string or file used to authenticate a transaction. A token may be one or multiple encrypted strings, files, passwords, cyphers or other data which may contain information used to perform or authenticate a transaction when sent to payment servers. These tokens may be encrypted using a public-private key encryption system. The vendor or a party with knowledge of the vendor's private key may generate an encrypted token. Alternatively, a payment system or e-commerce site may generate this token on behalf of the vendor.

When used herein, the term "user agent" may refer to software and/or hardware that are acting on behalf of a user.

Disclosed herein are processor-executable methods, computing systems, and related technologies for a vendor token generator for e-commerce transactions. The system and method may use an email server/account to complete checkout of any type of product (e.g., items/services/events/donations) for a transfer of funds from a customer to a vendor (e.g. retail site, charity, political organization or other vendor.) While the technologies described herein are described using email as an example, they may also be applicable to similar communication mediums, such as SMS and MMS communication channels.

Figure 1:
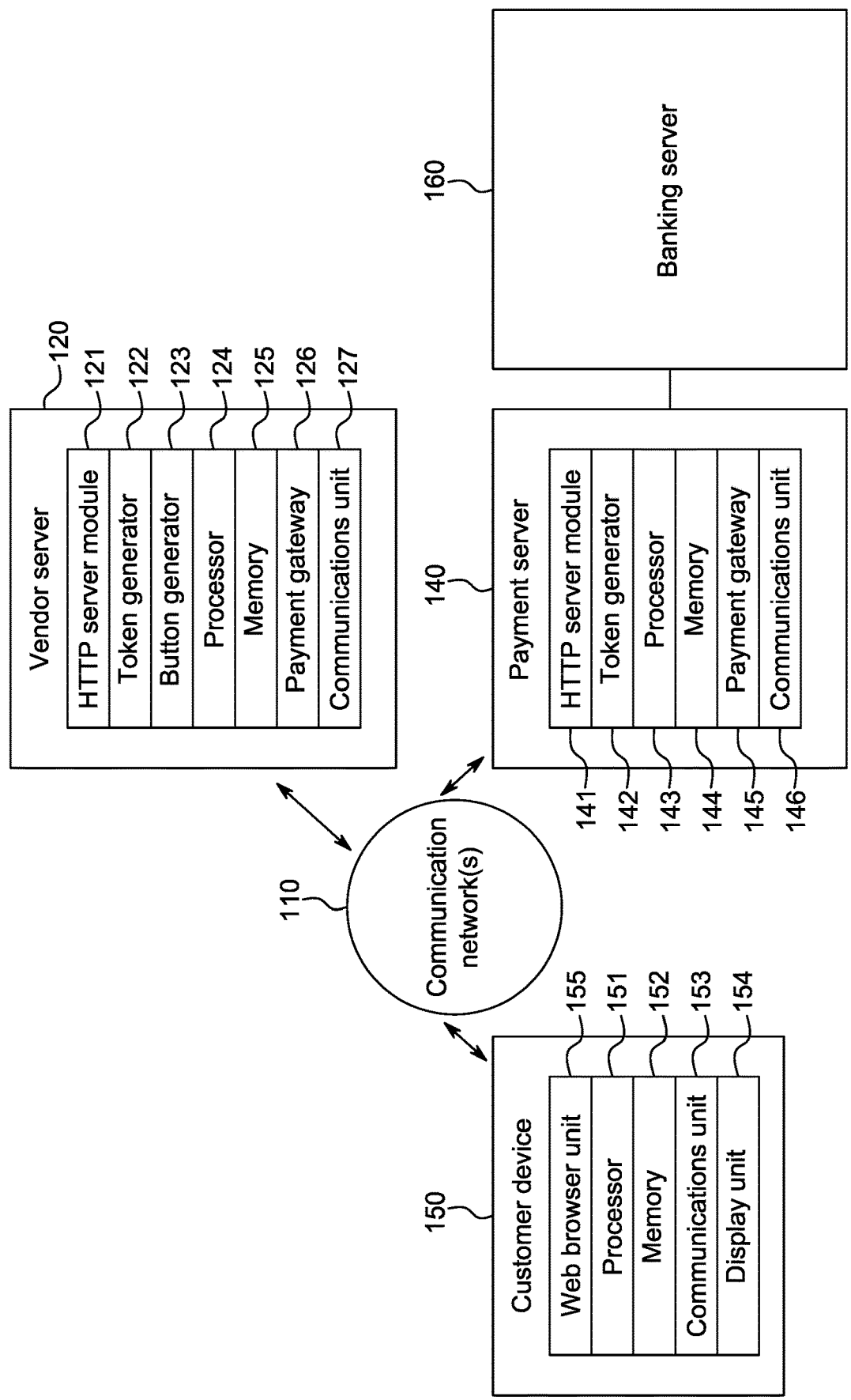
FIG. 1 shows an example system that may be used for a vendor token generator that may be used in e-commerce transactions.

FIG. 1 shows an example system 100 that may be used for vendor token generation that may be used in e-commerce transactions. The example system 100 includes a customer device 150, a vendor server 120, a payment server 140, and a banking server 160 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 includes a processor 151, memory 152, a communications unit 153, a display unit 154 and web browser unit 155, which may communicate data to/from the web server module(s) in the vendor server 120 and payment server 140. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices (not depicted) that are included in, or connected to, the customer device 150, such as a liquid crystal display (LCD) display or monitor. The customer device 150 may receive input from the user of the customer device 150 from input devices (not depicted) that are included in, or connected to, the customer device 150, such as a keyboard, a mouse, a microphone or a touch screen, and provide data that indicates the input to the web browser unit 155.

The vendor server 120 may include an HTTP server module 121, a token generator 122, a button generator 123, a processor 124, memory 125, a payment gateway 126 and a communications unit 127.

The HTTP server module 121 provides a website that may be accessed by a customer device 150. The HTTP server module 121 may implement the HTTP protocol, and may communicate Hypertext Markup Language (HTML) pages and related data from the website to/from the customer device 150 using HTTP. The vendor server 120 may be connected to one or more private or public networks (such as the Internet), via which the HTTP server module 121 communicates with devices such as the customer device 150. The HTTP server module 121 may generate one or more web pages and may communicate the web pages to the customer device 150, and may receive responsive information from the customer device 150.

The HTTP server module 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The payment gateway 126 may be a proprietary service that service that directly connects with the payment processors, such as banking server 160 to handle the credit card data, and authorize credit card payments.

The token generator 122 may generate tokens for use in e-commerce transactions. Tokens may be encrypted strings which contain information to perform a transaction when sent to the payment server(s) 140. A token may be one or multiple encrypted strings, files, passwords, cyphers or other data which may contain information used to perform or authenticate a transaction. A token may include one or more of the following parameters or other parameters not listed below:

a) Private-key: The private key provided by the payment server 140.

b) Public-key: Payment server's 140 public key, provided by the payment server 140.

c) Partner-id: The partner ID given provided by the payment server.

d) Environment: The environment the vendor wants to generate buttons for. This distinguishes whether the token is being used in a testing environment or in the live environment (and running real transactions).

e) Config: The path to a configuration file in yml format. This may hold a default set of information, e.g., private_key, public_key, partner_id, and other information—so they don't have to be entered separately each time a token is generated. The config field may also contain information specific to an offer (e.g. dollar amount) or a customer (e.g. card token) if multiple tokens are being generated with similar components.

f) Type: The type of token to generate (site, email, universal). There are multiple types of tokens that a token generator may generate and decode. For example, site tokens may be used for website transactions, email tokens for two-click email payments, and universal tokens for email validations.

g) Card: The card token associated with the recipient of this token. When a customer is registered with the payment server 140, the vendor receives a credit card token—a unique identifier that references the specific card associated with that customer and vendor. When the vendor is generating a token to submit to payment server 140, they may include the card token as a customer identifier.

h) Email: The email associated with the receipt of this token.

i) URL: The Signup URL the recipient should go to if customer does not have payment information registered with payment server 140.

j) Amount: The amount a user should be charged for the transaction the token is generated for.

k) User-data: Data to pass back as a reference. This data may include custom data that the vendor may want to pass through the payment server 140 and receive back when a transaction has completed. It may include an item reference number or SKU, customer address, or any other piece of data that is not required by payment server 140 to complete a transaction, but that the vendor wants associated with that transaction.

l) Expires: Expiration date for token, integer value of seconds since epoch.

m) Header-user-agent: The HTTP_USER_AGENT from the request header. HTTP headers are sent as part of a request from a customer's web browser unit 155 for a piece of information. These headers define the parameters that the web browser unit 155 is expecting to get back. The user-agent is the identifier of the software that is submitting the request—typically the identifier of the web browser unit 155 that is requesting the content.

n) Header-accept-language: The HTTP_ACCEPT_LANGUAGE from the request header. The accept-language is the acceptable language for the response—e.g. the language in which the web browser unit 155 is requesting the content be sent back.

o) Header-accept-charset: The HTTP_ACCEPT_CHARSET from the request header. The accept-charset is the character sets that are acceptable for the response—e.g. the character set in which the web browser unit 155 is requesting the content be sent back.

p) IP-address: The IP address of the token recipient.

The system 100 is designed to allow the vendor flexibility to offer deals for a limited time or number or responsive to available inventory. For example, the token may be configured to expire by default after two weeks, or any predetermined time, or never expire. The vendor server 120 may be configured to extend or shorten the expiration time of a particular offer associated with a token without resenting an email or generating a new token. Also, the vendor server 120 may send email updates for an offer associated with a token. This may be predetermined, or may be later set, depending upon demand by customers. Additionally, the vendor server 120 may generate groups of token values that may automatically invalidate members of the group when one token is processed. This is useful when sending out multiple tokens via email to a single customer or when sending out tokens to multiple customers, but when the vendor wants only one or a predetermined number of tokens to be processed. Therefore, when these tokens are used, the other tokens are invalidated, effectively rescinding the offered deal. The vendor server 120 may further be configured to send email notifications that the previously submitted token is now invalid.

The button generator 123 may create cross-client and cross-browser compatible buttons for email checkouts. In one embodiment, the button generator 123 may include the token generator 122 to automatically generate an associated token for each button that is created.

A button and an associated token, generated by the button generator 123 and/or the token generator 122 may be embedded on a web page created by the HTTP server module 121.

The memory 125 may be configured to store information associated with e-commerce transactions. This may include inventory information, information used to generate web pages, customer information, and other e-commerce data.

The payment server 140 may include an HTTP server module 141, a token generator 142, a processor 143, memory 144, payment gateway 145 and a communications unit 146. While only one vendor server 120 is shown communicating with the payment server 140, this is shown as an example only. Payment server 140 may communicate with multiple vendor servers 120. A customer, wishing to use the services of the payment server 140, may register his/her email address and payment information with the payment server 140. Similarly, vendors may register with the payment server 140. The payment server 140 may provide the vendor server 120 with a public key and private key to be used in token transaction in accordance with the methods described herein. When a transaction is attempted, the payment server 140 decodes the token, authenticates the sender of the email, and may process the transaction. While the payment server 140 is depicted as a separate entity in FIG. 1, this is shown as an example only. The payment server 140 may be controlled and/or co-located with the vendor server 120, the banking server 160.

The banking server 160 may be controlled by a third party system bank. The payment server 140 may communicate with the banking server 160 to verify that the customer has adequate funds or credit for the requested purchase. For example, the banking server 160 may be a controlled by VISA, AMERICAN EXPRESS, MASTERCARD or any other bank or banking or financial network that a customer may use for online payment. The banking server 160 may be a server for virtual currencies, such as BITCOIN, etc.

Figure 2:
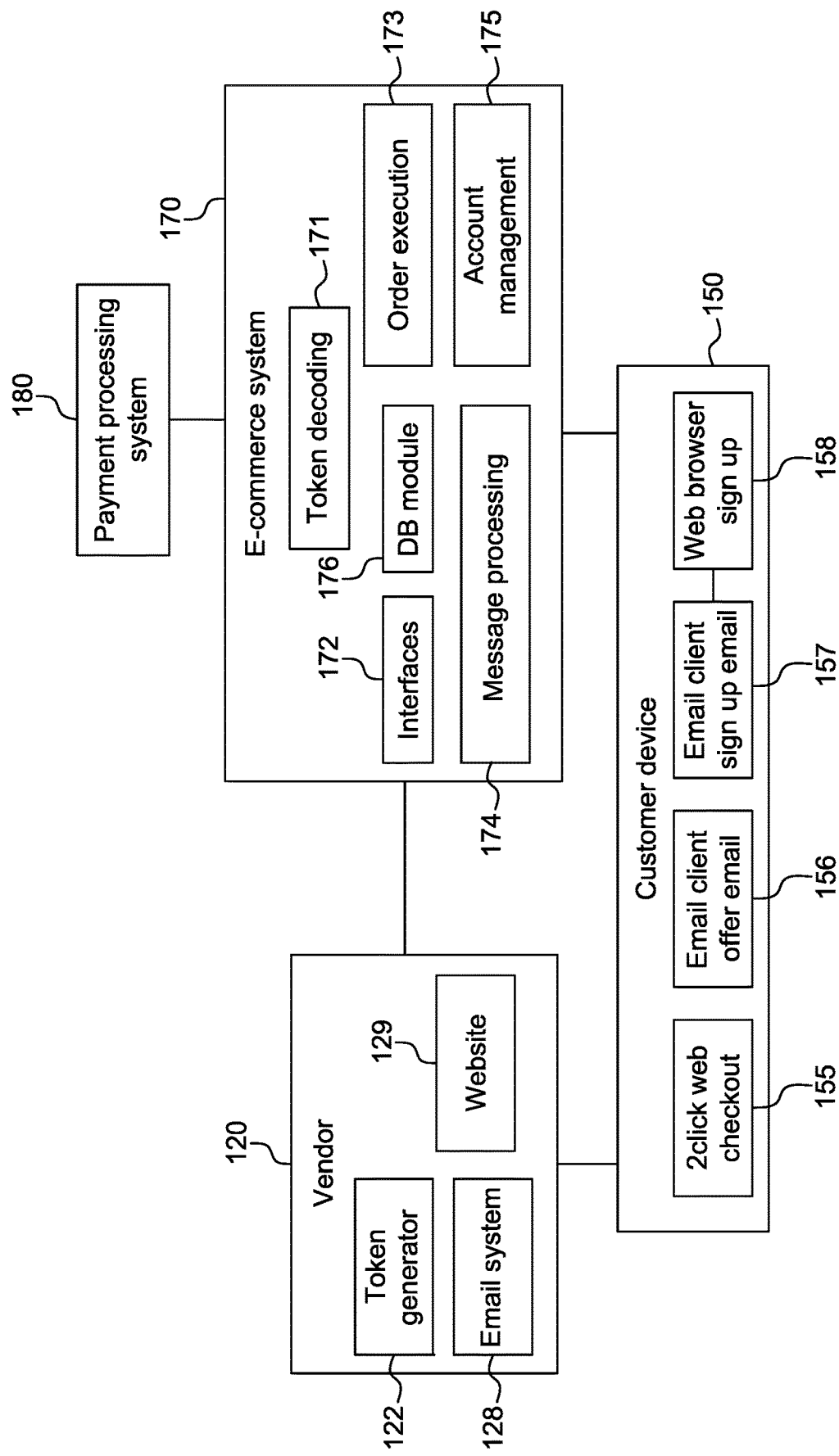
FIG. 2 shows another example of a system for a vendor token generator for email and web-based checkout.

FIG. 2 shows another example of a system for a vendor token generator for email and web-based checkout. As shown in FIG. 2, the example system may include a vendor server 120, a customer device 150, an e-commerce system 170 and a payment processing system 180. The architecture shown in FIG. 2 enables vendors to generate two-click tokens within their own vendor server 120, without requiring communication with the e-commerce system 170 at the time the tokens are created. As shown in FIG. 2, the example vendor server 120 may include token generator 122, a vendor email server 128 and vendor website 129. The example customer device 150 may comprise a two-click web checkout unit 155, an email client offer email module 156 an email client sign up email module 157 and web browser signup module 158. The e-commerce system 170 may comprise a token decoding unit 171, interface unit 172, a database module 176, an order execution unit 173, a message processing unit 174 and an account management unit 175. The two-click web checkout unit 155 may be an application or API or software based module enabling the customer device 150 to participate in a two-click web checkout. The email client offer email module 156 and the email client sign up email module 157 may be integrated with an email client or web client associated with the customer device 150. The web browser signup module 158 may be configured to facilitate the signing a customer up with the e-commerce system 170 as well as signing the customer in. This may facilitate the ability of the customer device 150 to respond to offers (e.g. without requiring manually signing in each time).

Regarding the e-commerce system 170, the token decoding unit 171 may be configured to decode tokens. The interface unit 172 may be configured to interface with the vendor server 120, the payment processing system 180, and one or more customer devices 150. The message processing unit 174 may be configured to process received email messages and to generate email messages. The order execution unit may be configured to execute e-commerce transactions. The account management unit 175 may be configured to manage accounts of a plurality of members (both vendors and customers) associated with the e-commerce system 170.

There may be multiple methods and types of two-click tokens that may be generated. As shown in the example of FIG. 2, there are two types shown. The vendor server 120 may generate a first type of token may for use with email checkout and/or a second type of token for URL checkout. The order in which the tokens are generated may be based on the time at which a vendor requests a token. The system is configured to use a secure and backwards compatible process for facilitation during the integration process. The methods and apparatus described herein may provide the vendor server 120 with improved security embedding more functionality in the vendor server 120. The methods described herein may reduce bandwidth by streamlining communications with the e-commerce system 170.

The vendor server 120 may generate an email offer that may be processed by the vendor email server 128. The token generator 122 may create the token to provide a purchase opportunity. In one embodiment, the token may be generated without requiring contact with the e-commerce system's 170 API. In another embodiment, the token may be created with some contact with the e-commerce system 170.

Token generation by the vendor server 120 may involve a public key cryptography solution, which currently may use the following technology components: encryption, using an XSalsa20 stream cipher; authentication using Poly1305 MAC; and/or public keys using Curve25519 high-speed elliptic curve cryptography. This above algorithms are used merely as an example to illustrate the user of public key cryptography, and not meant to be limiting to those specific algorithms.

To enable the vendor server 120 to create a token, the token generator 122 may comprise a token generation library is installed in the vendor server 120. The token generator 122 may comprise a custom library that meets token protocol formatting requirements determined by the e-commerce system 170.

The vendor server 120 may be configured with keys provided by the e-commerce system 170. The vendor server 120 receives a unique private and public key associated with the vendor, and a public key that the e-commerce system 170 uses for multiple partners. The vendor server 120 may generate a token with their unique key, and provide the e-commerce system's 170 public key as the intended target for messages.

The vendor server 120 inputs the required parameters for the specified token type into the token generator 122 and receives back the encrypted token containing some combination of the following information that the vendor may input:
  a. token type;
  b. card token (associated with the recipient of this token);
  c. email address for recipient (user that may be initiating a payment via two-click);
  d. amount of the transaction (numeric value);
  e. a unique partner id given to the partner (similar to the UUID but an additional column of a different type);
  f. signup URL (where the recipient is directed if their payment information is not on file);
  g. expiration date (after this time the token is no longer considered valid)
  h. group (tokens with a group equal to this value may not be considered valid after the execution of a single member);
  i. user data (data the vendor wants returned as a reference); and/or
  j. computer/browser identifiers (identifies user for security purposes).

The e-commerce system's 170 message processing unit 174 receives an email containing an encoded token (e.g. Base64), the e-commerce system 170 decrypts the key into the above information, confirms the key's validity, ensures that the vendor server 120 is authorized to generate tokens, and processes a payment for the user with the given email address. In another example, the vendor server 120 may pass a member identifier instead of an email address, which may specify a specific credit card or billing option to charge.

If a keyset is compromised, the e-commerce system 170 may be configured to disable the compromised keyset and generate another. If a vendor key is compromised, the e-commerce system 170 may simply reject the encrypted transaction tokens after revoking the signing keys. If the e-commerce system 170 private key is compromised, the e-commerce system 170 may be configured to transmit a key update to users of the e-commerce system 170 and revoke incoming transactions prior to the date of revocation.

The e-commerce system 170 may be configured to store a checksum of a token after it has been used, and to prevent the same from being used more than once. The e-commerce system 170 may further be configured to store a group reference number for a used token, and prevent the group reference number from being used more than a predetermined number of times. In one embodiment, the e-commerce system 170 may not store keys prior to their usage, which may reduce the need for the database module 176 to store all tokens at the time of their creation.

The token generator 122 may comprise a Ruby library that may allow the vendor server 120 to generate tokens upon receiving credentials generated by the e-commerce system 170.

The e-commerce system 170 may include an off-site library-based token generation system that may be configured to permit an automatic authenticated execution of a transaction via a web interface. A vendor server 120 that has its own private key and public key and the e-commerce system 170 public key may generate a token authorizing a transaction on the part of a customer. The customer device 150 or vendor server 120 may deliver this payload via email or another type of electronic messaging. The e-commerce system 170 may further comprise an email processing system that may be configured to verify an email address associated with the sender of an email. This may permit the payment server 140 to verify that the payload was indicated for use by the recipient (since the email is included in the decrypted payload message). To accommodate the processing of web-based checkout, the e-commerce system 170 may be configured to use a verification using the incoming IP address and browser details to assist in decoding certain token types.

In another embodiment, the e-commerce system 170 may perform authentication of a payload based on a combination of browser identification settings, an Internet connectivity address, and partner key generation.

Figure 3:
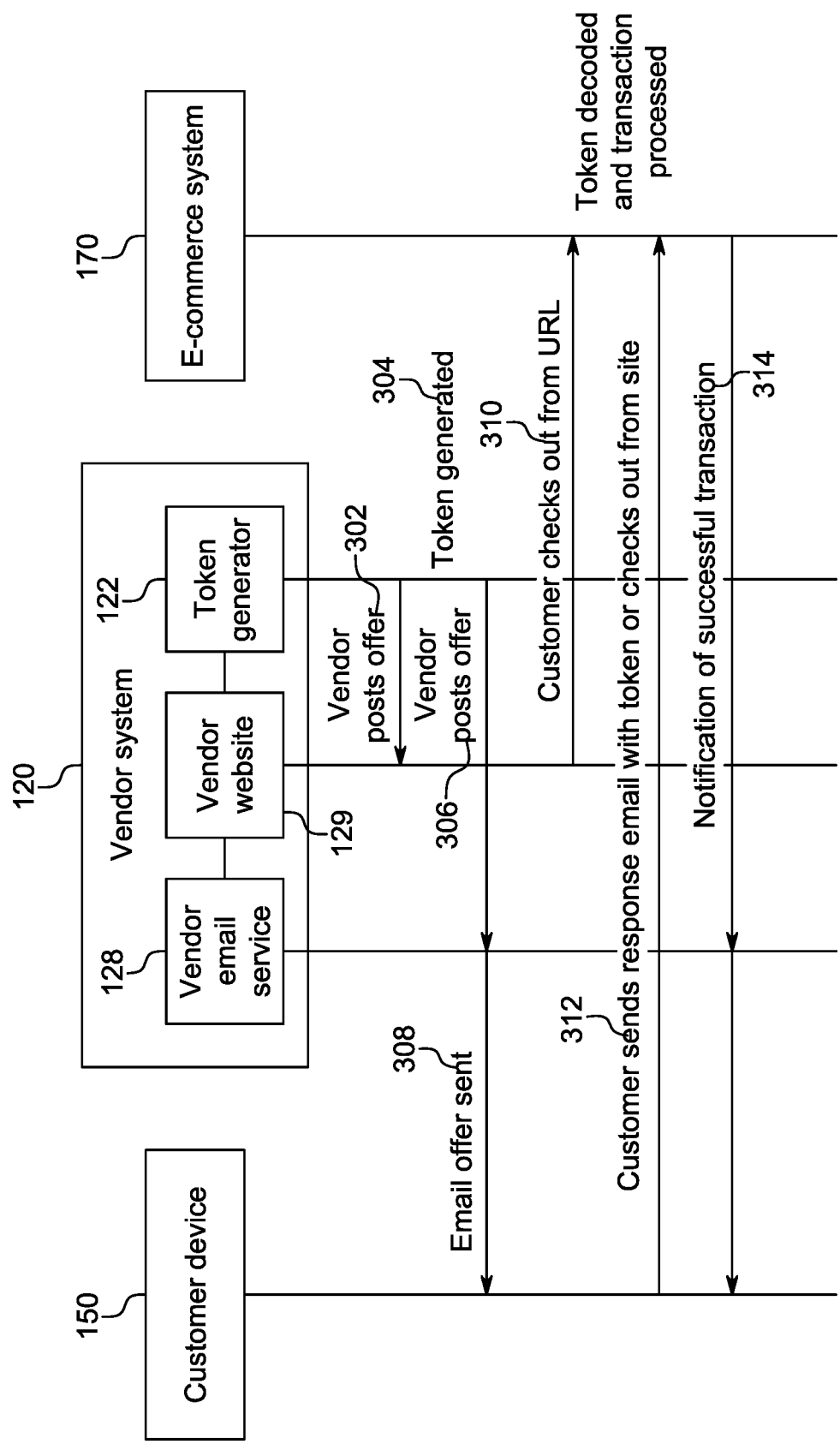
FIG. 3 shows a transactional diagram for a method for token generation.

FIG. 3 shows a transactional diagram for a method 300 for token generation. As shown in FIG. 3, a vendor may post an offer on vendor website 129 or generate an email using the vendor email server 128 (steps 302 and 306). Both may rely on the token generator 122 to generate a token (step 304). The token generator 122 as described above may create different types of tokens depending on the campaign. In the case of an email campaign, the vendor email server 128 may transmit the generated token as a part of an email message (step 308). Similarly, the customer may checkout the transaction from either the URL or an email. The system may be configured to allow a user to select multiple types of intended targets for a campaign. For example, when generating an offer, a user may select email recipients, a web page, a social media account, mobile phone numbers etc. The system may generate specific types of tokens for each type of intended recipient (e.g. SMS, email, web page etc.) A customer may checkout from the URL associated with the vendor website 129 or send a response email with the token embedded (steps 310 and 312), which then allows the e-commerce system 170 to decode the token and process the transaction. If the transaction is successful, the e-commerce system may then send a notice of successful transaction to the vendor email server 128 which may send an email to the customer device 150.

Figure 4:
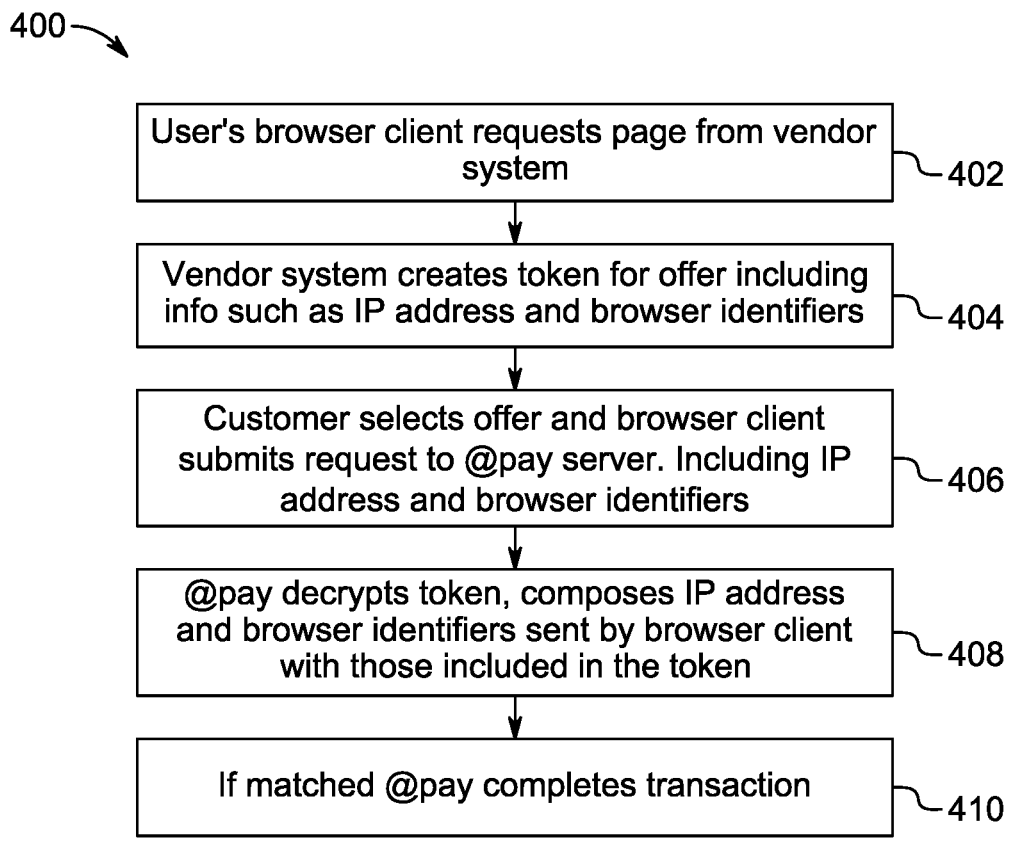
FIG. 4 is a flow diagram for a method of token generation using web-based steps.

FIG. 4 is a flow diagram for a method 400 of token generation using web-based steps. A customer device 150 may access a web page associated with a vendor. While accessing a web page, a browser client or app associated with the customer device 150 may request a page from the vendor server 120 (step 402). For example, the customer may browse to a with a price total offer on it. This web page may comprise a series of prices presented for one or more products and one or more quantities the web page may be for a checkout after a total is presented to the customer. In response to this request, the vendor server 120 may generate a token for an offer (step 404). This token may comprise an IP address and browser identifiers. The customer device 150 may be used to select an offer presented on the web page, which transmits a purchase request to the payment server 140 (step 406). This payment request may be transmitted directly from the customer device 150 or from the vendor server 120. The payment request may include an IP address and browser identifiers associated with the customer device 150 and/or the user of the customer device 150. The payment request is received by the payment server 140, which decrypts the token, and authenticates the IP address and browser identifiers sent by the browser client (step 408). If the token, IP address and browser identifiers are authenticated, the payment server 140 may complete the transaction.

Figure 5:
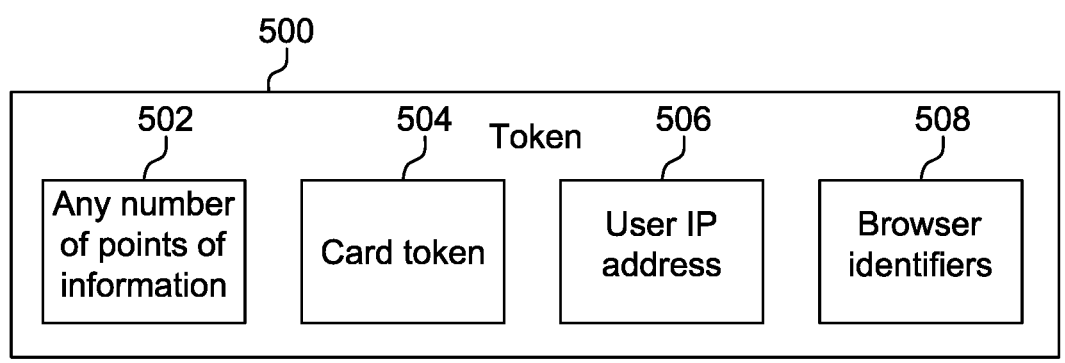
FIG. 5 shows a an example of a website token structure.

FIG. 5 shows an example of a structure for a website token 500. As shown in FIG. 5, element 502 may represent information that a vendor may request to be in a token. This may be customized as described above. The website token may comprise a card token 504, a user IP address 506, and browser identifiers 508. These elements are shown only as an example, as a website token may contain different elements to authenticate a transaction as described above.

Figure 6:
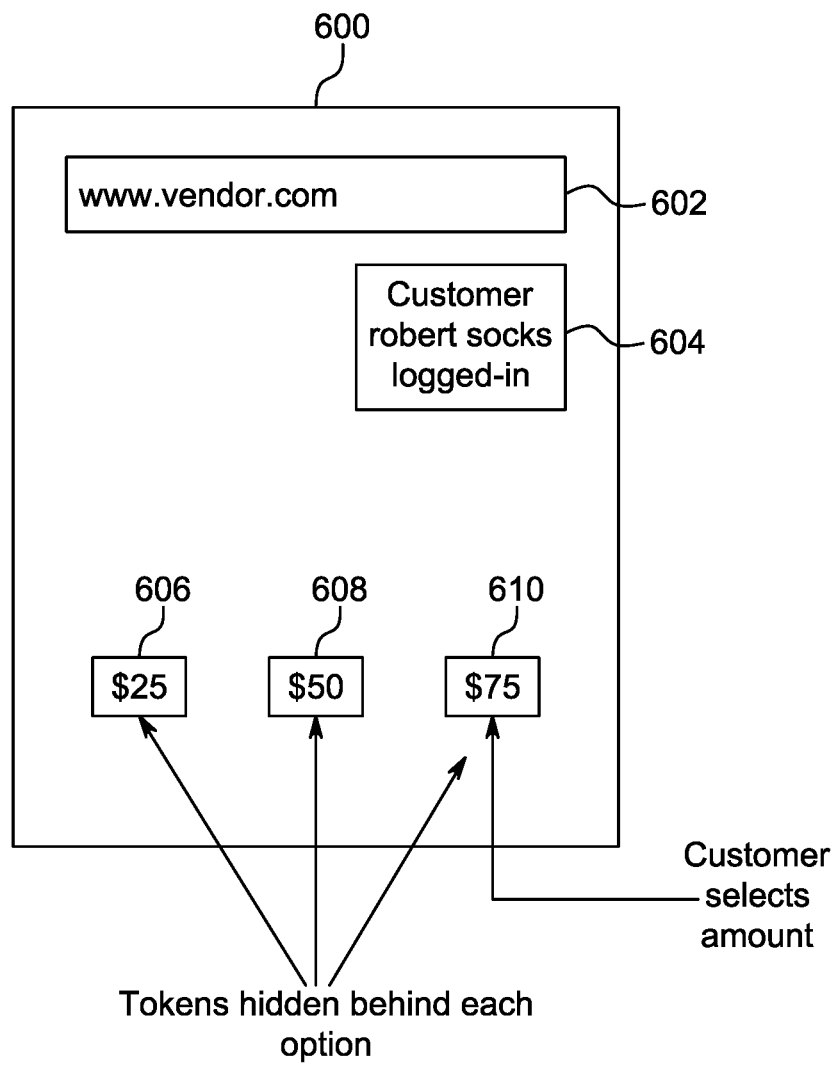
FIG. 6 shows an example of a web page for an URL Interface for web checkout.

FIG. 6 shows example web page 600 for a URL interface web checkout that may be displayed by the web browser unit 155 of the customer device 150. The web page 600 may include display elements which allow the user of the customer device 150 to complete e-commerce transactions from a vendor using one or more emails. The web page 600 may be included in a web browser window that is displayed and managed by the web browser unit 155. The web page 600 may include data received by the web browser unit 155 from the vendor server 120 and/or the payment server 140. As shown in FIG. 6, the web page 600 includes a plurality of input fields 602 and 606-610 as well as a display area 604. The example web page 600 may be used to solicit donations, for example for a fundraising campaign. Input field 602 indicates the webpage for the vendor. As shown in FIG. 6, display area 604 indicates that the user is logged in. Input fields 606-610 may each be associated with a different token, wherein each token is associated with a money value. A user wishing to donate a particular value may select one of the input fields 606-610 to facilitate a transaction for the displayed amount. In one embodiment, the token generator 122 may generate the tokens such that when one of the tokens in input fields 606-610 are selected, the others are disabled. This may prevent multiple clicks on the same web page erroneously resulting in multiple charges. In another embodiment, the token generator 122 may be configured may be in communication with the button generator 123 to assure that the displayed value and the token value are the same. Similarly, the payment server 140 may be configured to verify the displayed value versus the requested value.

FIG. 7 shows a transactional diagram for a method for generating a token with a website. The system may be configured to perform an automated browser-initiated payment. In addition to, or alternative to, using generating email tokens, a vendor token generator 122 may also generate tokens for URL based checkout. A browser checkout may be used in a scenario where a customer that is logged in is offered a dollar amount to be paid. Another scenario may be the moment of checkout where a total is presented to the customer, when the amount is selected by the customer a two-click checkout is generated for customer. As shown in FIG. 7 a customer, using a customer device 150 uses a client (e.g. app or web browser) to request a page from vendor server 120 (step 702). The vendor server 120 generates a token with associated signatures (step 704). In submitting the token parameters, the vendor server 120 includes the IP address of the incoming request and potentially other unique identifying information, such as user agent associated with the browser client of the customer device 150 or a generated cross-domain cookie. The customer device 150 receives the token (step 706). The customer device 150 may then be used to issue a request to the e-commerce system 170 (via direct request or JavaScript API call) containing the encrypted payload. This request may originate from the same system (i.e. customer device 150) as the request to the vendor's server 120 originated; the identifying information (such as the IP address, the user agent, and a cross-domain cookie value) may also remain part of this request. The e-commerce system 170 decrypts the payload, and compares the IP address, the user agent and the cross-domain cookie value to the values the partner's system has independently signed (step 710). If these values match, the e-commerce system 170 determines that the request is authorized by the vendor server 120 to make the transaction. The e-commerce system 170 then performs the transaction as specified by the other values in the token and notifies the vendor server 120 (step 712).

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or Bluray-Disc, or other type of device for electronic data storage.

Although the methods and features described above with reference to FIGS. 3-7 are described above as performed using the example system 100 of FIG. 1 or system 200 of FIG. 2, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-7 may be used alone without the other features and elements or in various combinations with or without other features and elements. Sub-elements of the methods and features described above with reference to FIGS. 1-7 may be performed in any arbitrary order (including concurrently), in any combination or sub-combination.

What is claimed is:

1. A method for improving security of a distributed payment system using Simple Mail Transfer Protocol (SMTP), the method comprising:
   generating, by a processor of a vendor server, a token for use with an email checkout, wherein the token comprises an identifier of a customer, an identifier of the vendor server, and an identifier of a transaction;
   sending, by the processor of the vendor server, an SMTP message that includes a hyperlink and the token to an email address of the customer, wherein the hyperlink when activated sends an SMTP email response message that includes the token from the customer to an e-commerce system;
   receiving, by the processor of the vendor server, a notification from the e-commerce system indicating that the transaction was successfully processed by the e-commerce system, wherein the e-commerce system processes the transaction by:
      authenticating a sender of the SMTP email response message as the customer based on an email address from which the SMTP email response message is received,
      decoding the token included in the SMTP email response message to form a decoded token,
      validating that the vendor server is authorized to generate the token based on the decoded token, and
      performing the transaction based on the decoded token when the authenticating and the validating are successful; and
   completing, by the processor of the vendor server, the email checkout in response to receiving the notification from the e-commerce system.

2. The method of claim 1, wherein the SMTP email message comprises multiple tokens.

3. The method of claim 2, wherein each of the multiple tokens is associated with a different offered product.

4. The method of claim 2, wherein each of the multiple tokens are associated with a different price.

5. The method of claim 1, further comprising:
   generating, by the processor, a second token for use with an URL checkout, wherein the second token is associated with the same offered product.

6. The method of claim 5, further comprising posting the second token on a social media website.

7. The method of claim 1, further comprising:
   transmitting a message to the e-commerce system, indicating that the token is in use.

8. The method of claim 1, wherein the authenticating is performed using the decoded token.

9. The method of claim 1, wherein the identifier of the customer is the email address of the customer.

10. A system for improving security of a distributed payment system using Simple Mail Transfer Protocol (SMTP), the system comprising:
    a communication interface that is communicatively coupled to an e-commerce system and a customer device via a network;
    a processor that is communicatively coupled to the communication interface, wherein the processor:
       generates a token for use with an email checkout, wherein the token comprises an identifier of a customer, an identifier of the system, and an identifier of a transaction,
       sends, using the communication interface, an SMTP message that includes a hyperlink and the token to an email address of the customer, wherein the hyperlink when activated sends an SMTP email response message that includes the token from the customer to the e-commerce system,
       receives, using the communication interface, a notification from the e-commerce system that the transaction was successfully processed by the e-commerce system, wherein the e-commerce system processes the transaction by:
          authenticating a sender of the SMTP email response message as the customer based on an email address from which the SMTP email response message is received,
          decoding the token included in the SMTP email response message to form a decoded token,
          validating that the system is authorized to generate the token based on the decoded token, and
          performing the transaction based on the decoded token when the authenticating and the validating are successful; and
       completes the email checkout in response to receiving the notification from the e-commerce system.

11. The system of claim 10, wherein the SMTP email message comprises multiple tokens.

12. The system of claim 11, wherein each of the multiple tokens is associated with a different offered product.

13. The system of claim 11, wherein each of the multiple tokens are associated with a different price.

14. The system of claim 10, wherein the processor is further configured to:
    generate a second token for use with an URL checkout, wherein the second token is associated with the same offered product.

15. The system of claim 14, wherein the processor is further configured to post the second token on a social media website.

16. The system of claim 10, wherein the processor is further configured to:
    transmit a message to the e-commerce system, indicating that the token is in use.

17. The system of claim 10, wherein the authenticating is performed using the decoded token.

18. The system of claim 10, wherein the identifier of the customer is the email address of the customer.

19. A non-transitory computer storage medium storing instructions for improving security of a distributed payment system using Simple Mail Transfer Protocol (SMTP), the instructions comprising:
    a first software program that when executed by a processor of a vendor server causes the processor of the vendor server to execute a method that includes:
       generating a token for use with an email checkout, wherein the token comprises an identifier of a customer, an identifier of the vendor server, and an identifier of a transaction,
       sending an SMTP message that includes a hyperlink and the token to an email address of the customer, wherein the hyperlink when activated sends an SMTP email response message that includes the token from the customer to an e-commerce system, receiving a notification from the e-commerce system indicating that the transaction was successfully processed by the e-commerce system, and completing the email checkout in response to receiving the notification from the e-commerce system; and a second software program that when executed by a processor of the e-commerce system causes the processor of the e-commerce system to process the transaction, wherein the processor of the e-commerce system processes the transaction by:

authenticating a sender of the SMTP email response message as the customer based on an address from which the SMTP email response message is received, decoding the token included in the SMTP email response message to form a decoded token, validating that the vendor server is authorized to generate the token based on the decoded token, and performing the transaction based on the decoded token when the authenticating and the validating are successful.

20. The non-transitory computer storage medium of claim 19, wherein the authenticating is performed using the decoded token.

* * * * *